(12) United States Patent
Sugiyama et al.

(10) Patent No.: US 10,552,816 B2
(45) Date of Patent: Feb. 4, 2020

(54) TRANSACTION SYSTEM, PROCESSING DEVICE, AND CONTROL DEVICE

(71) Applicant: Seiko Epson Corporation, Tokyo (JP)

(72) Inventors: Yuichi Sugiyama, Matsumoto (JP); Keigo Mori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 888 days.

(21) Appl. No.: 14/991,427

(22) Filed: Jan. 8, 2016

(65) Prior Publication Data

US 2016/0203457 A1 Jul. 14, 2016

(30) Foreign Application Priority Data

Jan. 9, 2015 (JP) .................................. 2015-003153

(51) Int. Cl.
*G06Q 20/20* (2012.01)
*G06Q 20/22* (2012.01)
*H04L 29/08* (2006.01)

(52) U.S. Cl.
CPC .............. *G06Q 20/22* (2013.01); *G06Q 20/20* (2013.01); *G06Q 20/208* (2013.01); *G06Q 20/209* (2013.01); *H04L 67/1097* (2013.01); *H04L 67/146* (2013.01); *H04L 67/2804* (2013.01); *H04L 67/2819* (2013.01)

(58) Field of Classification Search
CPC ........ G06Q 20/20; G06Q 30/02; G06K 15/00; G07G 1/12
USPC ............ 358/1.6; 705/14.33, 21, 24; 235/383
See application file for complete search history.

(56) References Cited

U.S. PATENT DOCUMENTS

| 2004/0032083 | A1* | 2/2004 | Walker | G06Q 10/087 273/269 |
| 2004/0193538 | A1* | 9/2004 | Raines | G06Q 20/0453 705/39 |
| 2005/0286088 | A1* | 12/2005 | Takagi | B41J 11/008 358/3.28 |
| 2006/0237533 | A1* | 10/2006 | Stelzer | G06Q 20/209 235/383 |
| 2007/0211135 | A1* | 9/2007 | Moreland | B41J 2/32 347/221 |
| 2012/0130888 | A1* | 5/2012 | Cooke | G06Q 20/3272 705/39 |
| 2012/0130889 | A1* | 5/2012 | Lyons | G06Q 20/3272 705/39 |

(Continued)

FOREIGN PATENT DOCUMENTS

JP 11-154276 A 6/1999
JP 2008-139943 A 6/2008

(Continued)

*Primary Examiner* — Oluseye Iwarere
(74) *Attorney, Agent, or Firm* — Workman Nydegger (57) ABSTRACT

A recording device in a transaction processing system extracts extraction information that is used in a process executed by a control server to provide a service from transaction information based on a transaction process, and outputs a code containing a URL of the control server to which extraction information and identification information are added. When accessed by a terminal reading the code, the control server acquires and stores the extraction information and uniform identification information added to the URL, and uses the stored extraction information to execute a process providing a service.

18 Claims, 6 Drawing Sheets

(56) References Cited

U.S. PATENT DOCUMENTS

| | | | |
|---|---|---|---|
| 2013/0110607 A1* | 5/2013 | Basmajian | G06Q 30/0238 705/14.26 |
| 2014/0236713 A1* | 8/2014 | Gotanda | G06Q 30/0253 705/14.51 |
| 2014/0249951 A1* | 9/2014 | Gotanda | G06Q 20/0453 705/24 |
| 2014/0307271 A1* | 10/2014 | Suzuki | G06Q 20/0453 358/1.6 |
| 2014/0307272 A1* | 10/2014 | Suzuki | G07G 5/00 358/1.6 |
| 2015/0161647 A1* | 6/2015 | Arai | G06Q 30/0233 705/14.33 |
| 2015/0206111 A1* | 7/2015 | Sugiyama | G06Q 30/0267 705/14.66 |
| 2015/0348005 A1* | 12/2015 | Inagawa | G06Q 20/3224 705/44 |
| 2015/0356522 A1* | 12/2015 | Matsumoto | G06Q 20/0453 705/30 |
| 2015/0356538 A1* | 12/2015 | Okada | G06Q 20/204 705/17 |
| 2015/0356542 A1* | 12/2015 | Matsumoto | G06Q 20/0453 705/24 |
| 2015/0356617 A1* | 12/2015 | Sugiyama | G06Q 30/0267 705/14.64 |
| 2015/0356689 A1* | 12/2015 | Gotanda | G06Q 40/12 705/30 |
| 2016/0063499 A1* | 3/2016 | Sugiyama | G06Q 20/407 705/23 |
| 2016/0071080 A1* | 3/2016 | Sugiyama | G07G 5/00 705/21 |
| 2016/0321640 A1* | 11/2016 | Suzuki | G06Q 20/0453 |
| 2017/0039542 A1* | 2/2017 | Matsumoto | G06Q 20/0453 |
| 2017/0103623 A1* | 4/2017 | Sugiyama | G06Q 20/407 |

FOREIGN PATENT DOCUMENTS

| | | |
|---|---|---|
| JP | 2008-139944 A | 6/2008 |
| JP | 2012-053850 A | 3/2012 |
| JP | 2014-078265 A | 5/2014 |
| JP | 2014-085863 A | 5/2014 |
| JP | 2014-170557 A | 9/2014 |

\* cited by examiner

| UNIFORM IDENTIFICATION INFORMATION | STORE INFORMATION | RECEIPT DATE | LINE ITEMS | | | SUBTOTAL | TAX | TRANSACTION TOTAL 421 | CUSTOMER ID | RA1 |
|---|---|---|---|---|---|---|---|---|---|---|
| | | | QUANTITY | PRODUCT NAME | UNIT PRICE | | | | | |
| ⋮ | | | | | | | | | | |
| XXXX-00001 | CITY··· | 1/1/2014/ 12:00:00 | 2 | APPLE-1 | 5.00 | 70.00 | 6.13 | $76.13 | — | |
| | | | 1 | TOY-1 | 60.00 | | | | | |
| ⋮ | | | | | | | | | | |

FIG. 5B

| UNIFORM IDENTIFICATION INFORMATION | STORE INFORMATION | RECEIPT DATE | LINE ITEMS | | | SUBTOTAL | TAX | TRANSACTION TOTAL 421 | CUSTOMER ID | RB1 |
|---|---|---|---|---|---|---|---|---|---|---|
| | | | QUANTITY | PRODUCT NAME | UNIT PRICE | | | | | |
| ⋮ | | | | | | | | | | |
| XXXX-00001 | — | — | — | — | — | — | — | $76.13 | U0001 | |
| | | | — | — | — | | | | | |
| ⋮ | | | | | | | | | | |

FIG. 5C

| UNIFORM IDENTIFICATION INFORMATION | STORE INFORMATION | RECEIPT DATE | LINE ITEMS | | | SUBTOTAL | TAX | TRANSACTION TOTAL 421 | CUSTOMER ID | RC1 |
|---|---|---|---|---|---|---|---|---|---|---|
| | | | QUANTITY | PRODUCT NAME | UNIT PRICE | | | | | |
| ⋮ | | | | | | | | | | |
| XXXX-00001 | CITY··· | 1/1/2014/ 12:00:00 | 2 | APPLE-1 | 5.00 | 70.00 | 6.13 | $76.13 | U0001 | |
| | | | 1 | TOY-1 | 60.00 | | | | | |
| ⋮ | | | | | | | | | | |

FIG. 6

TRANSACTION SYSTEM, PROCESSING DEVICE, AND CONTROL DEVICE

Priority is claimed under 35 U.S.C. § 119 to Japanese Application no. 2015-003153 filed on Jan. 9, 2014 which is hereby incorporated by reference in their entirety.

BACKGROUND

1. Technical Field

The present disclosure relates to a transaction system, a processing device, and a control device.

2. Related Art

Transaction processing systems (payment data provider systems) in which a specific processing device uploads transaction information (payment data) based on a transaction process (payment process) to a control device (main server), generates a symbolic image encoding the address to which the uploaded information is sent, and displays the symbolic image are known from the literature. See, for example, JP-A-2008-139944. When then accessed by a terminal reading the symbolic image, the control device can execute a specific process and provide a service in response to the access.

When the processing device and the control device that connect through a network cannot communicate because of a communication error, for example, the control device in the transaction system described in JP-A-2008-139944 cannot provide service based on the transaction information.

SUMMARY

A transaction processing system according to the disclosure includes a processing device that transmits transaction information, and a control device that receives transaction information from the processing device and executes a specific process, and executes an appropriate process when communication between the processing device and the control device is not possible.

A transaction processing system according to an aspect of the disclosure includes a control device configured to execute a specific process; and a processing device configured to connect through a network to the control device, extract extraction information used by the control device to execute the specific process from transaction information based on a transaction process, and output a code representing a URL of the control device to which the extraction information and identification information identify the transaction information are added. The control device acquires and stores the extraction information and the identification information added to the URL, and uses the stored extraction information to execute a specific process when accessed by a terminal based on reading the code.

This aspect of the disclosure can execute an appropriate process when communication between the processing device and control device is disabled.

In a transaction processing system according to another aspect of the disclosure, the processing device stores configuration information related to the extraction information to extract, and extracts the extraction information based on the configuration information.

By changing the configuration information, this aspect of the disclosure enables desirably changing the extraction information that the processing device extracts.

In a transaction processing system according to another aspect of the disclosure, the processing device sends the identification information and the transaction information including the extraction information to the control device when communication with the control device is enabled, and when communication with the control device is disabled, sends the identification information and the transaction information including the extraction information to the control device after communication is enabled again. The control device stores the transaction information by overwriting the extraction information stored in response to access from the terminal with the extraction information contained in the transaction information when the transaction information and the identification information are received from the processing device after the extraction information and the identification information are stored in response to access from the terminal.

The control device in this aspect of the disclosure can therefore prevent errors resulting from storing extraction information based on the same transaction more than once.

In a transaction processing system according to another aspect of the disclosure, the processing device produces a receipt printed with the transaction information, and prints and outputs the code on the produced receipt.

Thus comprised, a customer that has completed a transaction can access the control device from a terminal and cause the control device to execute a specific process.

In a transaction processing system according to another aspect of the disclosure, the processing device has a display unit configured to display information, and displays and outputs the code on the display unit.

This configuration enables a customer that has completed a transaction to access the control device from a terminal by a simple operation, and cause the control device to execute a specific process.

In a transaction processing system according to another aspect of the disclosure, the specific process executed by the control device executes is a process of awarding points based on the stored extraction information to the terminal that accessed the control device.

When the control device is accessed from a terminal, this aspect of the disclosure uses the extraction information to reliably award points based on the transaction to the customer.

In a transaction processing system according to another aspect of the disclosure, the specific process executed by the control device executes is a process of returning information based on the stored extraction information in response to a query from an external device.

The control device can therefore return accurate information when queried by an external device about information related to a terminal that accessed the control device by reading the code.

An information processing method according to another aspect of the disclosure is characterized by a processing device extracting extraction information used by a control device to run a specific process from transaction information based on a transaction process, and outputs a code representing a URL of the control device to which the extraction information and identification information are added. The control device acquires and stores the extraction information and the identification information added to the URL, and uses the stored extraction information to execute a specific process when accessed by a terminal based on reading the code.

This aspect of the disclosure can execute an appropriate process when communication between the processing device and control device is disabled.

Another aspect of the disclosure is a processing device configured to connect through a network to a control device, the processing device extracting extraction information used by the control device to execute a specific process from transaction information based on a transaction process, and outputting a code representing a URL of the control device to which the extraction information and identification information identify the transaction information are added.

This aspect of the disclosure can execute an appropriate process when communication between the processing device and control device is disabled.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of the present disclosure is described below with reference to the accompanying figures.

Figure 1:
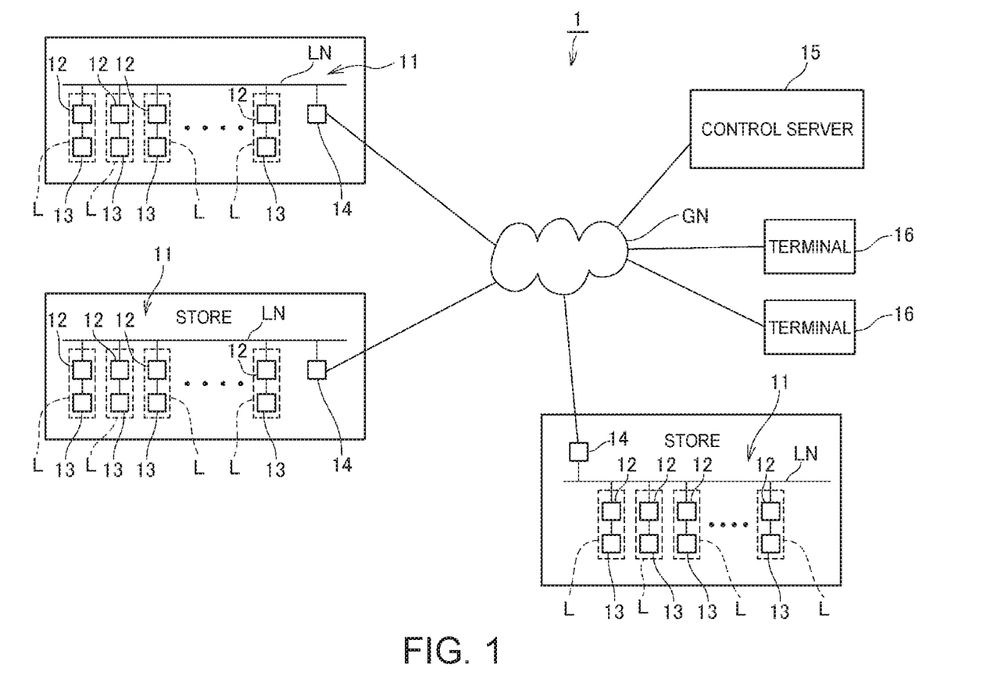
FIG. 1 illustrates the configuration of a transaction processing system according to a preferred embodiment of the disclosure.

FIG. 1 shows the configuration of a transaction processing system 1 according to a preferred embodiment of the disclosure.

As shown in FIG. 1, the transaction processing system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

One or more checkout counters L where customer transactions are processed are located in the business. A recording device 12 (processing device) capable of recording on a recording medium, and a POS terminal 13 that communicates with the recording device 12 and controls the recording device 12, are installed at each checkout counter L.

During a transaction at the checkout counter L, the cash register operator reads barcodes from the products or product packaging using a barcode reader BR connected to the POS terminal 13, and inputs information related to the transaction to the POS terminal 13. Based on input from the barcode reader BR and transaction-related input from the operator, the POS terminal 13 controls the recording device 12 to produce a receipt. The receipt produced by the recording device 12 is then given by the operator to the customer.

The configuration, functions, and processes based on the functions of the recording device 12 and POS terminal 13 are described further below.

A local area network LN is deployed in the store system 11.

The recording device 12 connects to the local area network LN using a communication protocol used on the LAN.

A communication device 14 is also connected to the local area network LN. The communication device 14 is an interface device that connects to the local area network LN and a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The recording device 12 can also access the global network GN through the communication device 14.

A control server 15 (control device) is connected to the global network GN. The control server 15 is a cloud server in a cloud system in which the recording device 12 is a client. More specifically, when triggered by a request from a client, for example, the control server 15 runs a specific operating process and sends data based on the result of the process to the client. The control server 15 is represented by a single function block in FIG. 1, but this does not mean that the control server 15 is embodied by a single server device. For example, the control server 15 may include a plurality of server devices. More specifically, the control server 15 may be configured in any way enabling executing the processes described below.

A terminal 16 also connects to the global network GN. The terminal 16 in this example is the tablet-type cell phone (a smartphone) of a customer. The terminal 16 may, however, be any terminal device that can execute the processes described below. For example, a tablet computer may also be used as a terminal 16.

Figure 2:
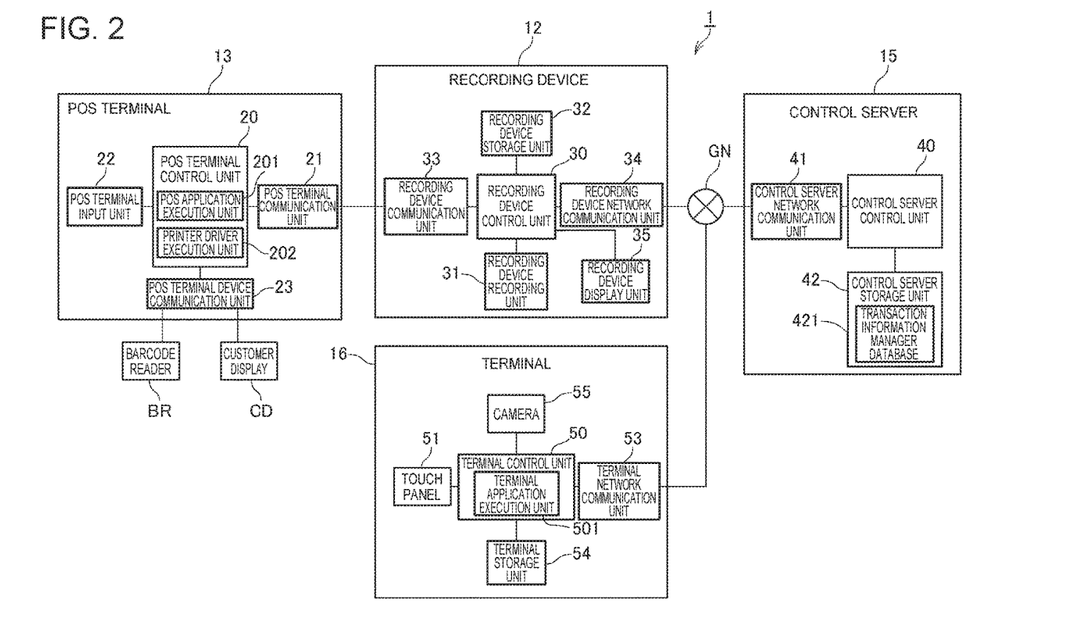
FIG. 2 is a block diagram illustrating the functional configuration of devices in the transaction processing system.

FIG. 2 is a block diagram illustrating the functional configuration of the POS terminal 13, recording device 12, and control server 15.

The POS terminal 13 is a host computer that runs transaction-related processes and controls the recording device 12.

As shown in FIG. 2, the POS terminal 13 includes a POS terminal control unit 20, a POS terminal communication unit 21, a POS terminal input unit 22, and a POS terminal device communication unit 23.

The POS terminal control unit 20 includes a CPU, ROM, RAM, and controls the POS terminal 13. The POS terminal control unit 20 has a POS application execution unit 201 and a printer driver execution unit 202. The function of the POS application execution unit 201 is embodied by the POS terminal control unit 20 reading and running an installed POS application. The function of the printer driver execution unit 202 is embodied by the POS terminal control unit 20 reading and running an installed printer driver. The processes run by these function blocks are described further below.

The POS terminal communication unit 21 communicates with the recording device 12 according to a specific communication protocol as controlled by the POS terminal control unit 20.

The POS terminal input unit 22 has input means such as a keypad or operating keys, detects input to the input means, and outputs to the POS terminal control unit 20. Based on input from the POS terminal input unit 22, the POS terminal control unit 20 then executes a process appropriate to the input.

The POS terminal device communication unit 23 is an interface board with a USB port, a serial communication port other than a USB port, or other types of communication ports. Various devices can connect to the different ports. The POS terminal device communication unit 23 communicates with devices connected to the POS terminal 13 through the appropriate ports as controlled by the POS terminal control unit 20.

Note that the POS terminal device communication unit 23 may also have a wireless communication port and communicate with other devices wirelessly.

A barcode reader BR and customer display CD are examples of devices connected to the POS terminal 13 in this example.

The barcode reader BR is used to read barcodes from products and product packaging, and outputs data representing the read barcodes to the POS terminal device communication unit 23. The POS terminal device communication unit 23 then outputs the data input from the barcode reader BR to the POS terminal control unit 20.

The customer display CD displays transaction-related information as controlled by the POS terminal control unit 20. The information presented on the customer display CD can be read by the customer involved in the transaction at the checkout counter L.

The recording device 12 (processing device) is a thermal line printer that holds roll paper and forms dots on the stored roll paper with a line thermal head to record images.

As shown in FIG. 2, the recording device 12 has a recording device control unit 30, a recording device recording unit 31, a recording device storage unit 32, a recording device communication unit 33, a recording device network communication unit 34, and a recording device display unit 35 (display unit).

The recording device control unit 30 includes a CPU, ROM, RAM, and other peripheral circuits, and controls the recording device 12.

The recording device recording unit 31 includes mechanisms related to recording on roll paper, such as a conveyance mechanism for conveying roll paper stored inside the cabinet of the recording device 12, a recording mechanism for forming dots and recording images on the roll paper with a thermal head, and a cutter mechanism for cutting the roll paper at a specific position. The recording device recording unit 31 records receipt-related images on the roll paper by the recording mechanism while conveying the roll paper with the conveyance mechanism, and then cuts the roll paper at a specific position with the cutter mechanism, producing a receipt.

The recording device storage unit 32 has nonvolatile memory and stores data.

The recording device communication unit 33 communicates with the POS terminal 13 according to a specific communication protocol as controlled by the recording device control unit 30.

The recording device network communication unit 34 communicates with devices connected to the global network GN (including the control server 15) according to a specific communication protocol as controlled by the recording device control unit 30.

The recording device display unit 35 has an LCD panel or other type of display panel, and displays information as controlled by the recording device control unit 30.

The control server 15 is a cloud server to which the recording device 12 connects as a client.

As shown in FIG. 2, the control server 15 includes a control server control unit 40, control server network communication unit 41, and control server storage unit 42.

The control server control unit 40 includes a CPU, ROM, RAM, and other peripheral circuits, and controls the control server 15.

The control server network communication unit 41 communicates with devices connected to the global network GN (including recording devices 12) according to a specific communication protocol as controlled by the control server control unit 40.

The control server storage unit 42 includes nonvolatile memory, and stores data. The data stored by the control server storage unit 42 is described further below.

As shown in FIG. 2, the terminal 16 has a terminal control unit 50, a touch panel 51, a terminal network communication unit 53, a terminal storage unit 54, and a camera 55.

The terminal control unit 50 includes a CPU, ROM, RAM, and other peripheral circuits, and controls the terminal 16.

The touch panel 51 includes a display panel on the front of the terminal 16, and a touch sensor disposed over the display panel. The display panel may be a LCD panel, OLED panel, or other type of display. The touch sensor is a capacitive or pressure sensitive sensor, detects touch operations by the user's fingers or a stylus, for example, and outputs to the terminal control unit 50. The terminal control unit 50 executes processes appropriate to the touch operation based on input from the touch sensor.

The terminal network communication unit 53 communicates through the global network GN with other devices (including the control server 15) connected to the network according to a specific communication protocol as controlled by the terminal control unit 50.

The terminal storage unit 54 includes nonvolatile memory and stores data.

The camera 55 includes an imaging element such as a CCD image sensor or a CMOS image sensor, a photographic lens group, and a lens drive unit that drives the photographic lens group to adjust the zoom or focus, for example, and is used to take pictures. The camera 55 generates picture image data from the captured image, and outputs to the terminal control unit 50.

A specific application (referred to below as the terminal application AP) is previously installed to the terminal 16. The terminal control unit 50 of the terminal 16 includes a terminal application execution unit 501 that executes processes through functions of the terminal application AP. The functions of the terminal application execution unit 501, and processes executed by those functions, are described further below.

The operation of the POS terminal 13, recording device 12, and control server 15 during a customer transaction at the checkout counter L is described next.

Figure 3:
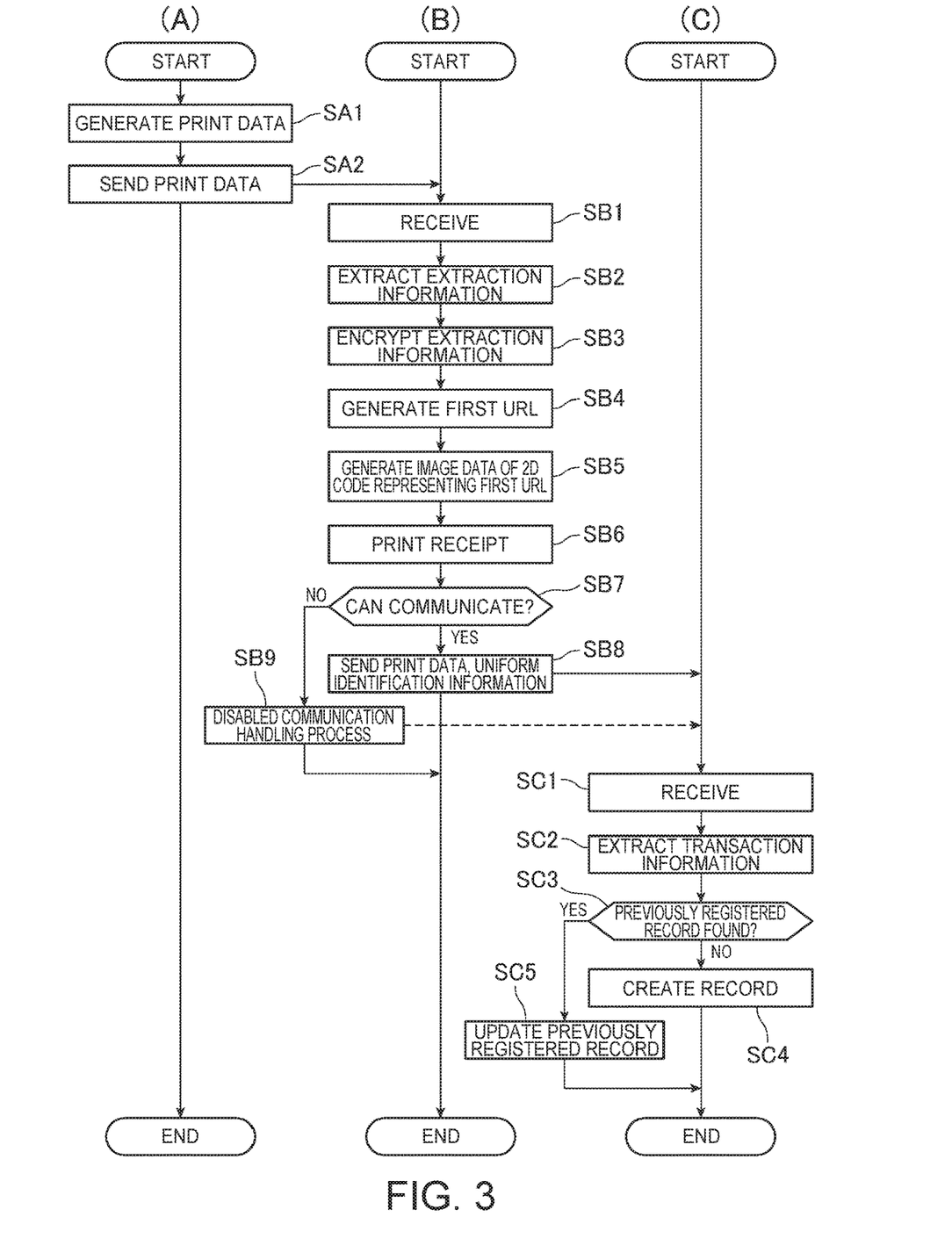
FIG. 3 is a flowchart illustrating the operation of the POS terminal, recording device, and control server in the transaction processing system.

FIG. 3 is a flow chart of the operation of the POS terminal 13, recording device 12, and control server 15, column (A) of FIG. 3 showing the operation of the POS terminal 13, column (B) of FIG. 3 showing the operation of the recording device 12, and column (C) of FIG. 3 showing the operation of the control server 15.

As shown in column (A) of FIG. 3, the POS terminal control unit 20 of the POS terminal 13 executes a transaction process (payment process) based on the customer transaction, and generates print data based on the transaction process (step SA1). The print data is control data for producing a receipt.

More specifically, in step SA1, the POS application execution unit 201 of the POS terminal control unit 20 generates receipt information based on the customer transaction. The receipt information is information the recording device 12 records on the produced receipt.

Next, the POS application execution unit 201 outputs the generated receipt information to the printer driver execution unit 202.

The printer driver execution unit 202 generates print data based on the receipt information input from the POS application execution unit 201. The print data is control data instructing producing a receipt with the receipt information recorded according to the layout of the receipt, and includes plural control commands in the command language of the recording device 12.

Figure 4:
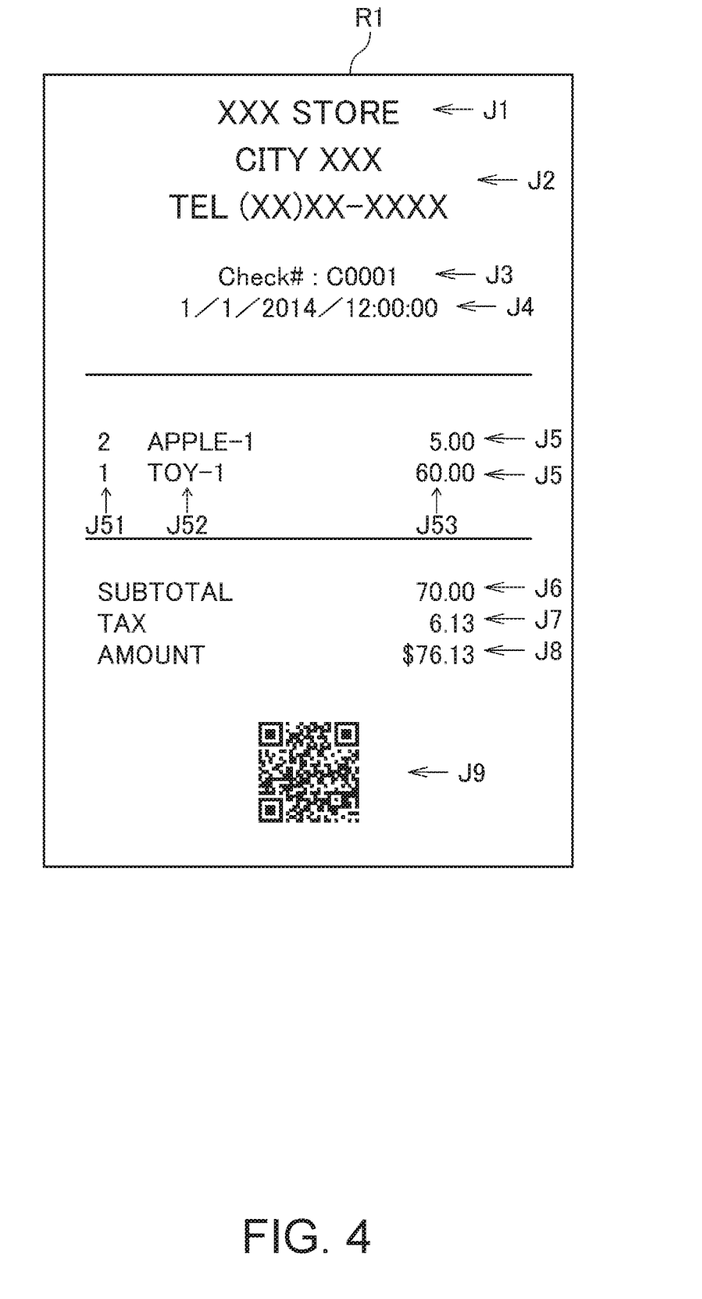
FIG. 4 shows an example of a receipt.

FIG. 4 shows receipt R1 as an example of a receipt produced by a recording device 12 based on the print data.

Logo J1, which is a graphic representation of the name of the store, is recorded on the receipt R1 shown in FIG. 4.

Store information J2 such as the address and telephone number of the store is also recorded on the receipt R1.

Receipt identification information J3 identifying the receipt is also recorded on the receipt R1.

Also recorded on the receipt R1 is receipt date information J4 indicating when the receipt was produced.

One or more lines of line item information J5 containing information related to the products purchased by the customer is also recorded on the receipt R1. The line item information J5 includes for each product purchased by the customer: purchase quantity information J51 including information indicating the quantity (number) of the product on that line, product name information J52 including information indicating the name of the product, and unit price information J53 including information indicating the unit price of the product.

Subtotal information J6 indicating the subtotal is also recorded on the receipt R1.

Tax-related information J7 indicating the applicable taxes is also recorded on the receipt R1.

Transaction total information J8 identifying the total amount of the transaction is also recorded on the receipt R1.

A code image J9 (code), which is a 2D code symbol, is also recorded on the receipt R1. This code image J9 is described further below.

In the sample receipt R1 shown in FIG. 4, the receipt information includes the information from the logo J1 to the transaction total information J8.

After generating the print data in step SA1, the POS terminal control unit 20 controls the POS terminal communication unit 21 to send the resulting print data to the recording device 12 (step SA2).

As shown in column (B) of FIG. 3, the recording device control unit 30 of the recording device 12 controls the recording device communication unit 33 to receive the print data (step SB1).

Next, the recording device control unit 30 extracts information from the print data received in step SB1 (step SB2). The process of step SB2 is described below.

As described above, receipt information is contained in the print data. Transaction information is contained in the receipt information. The transaction information is a predetermined subset of the receipt information. In the sample receipt R1 shown in FIG. 4, the transaction information in this embodiment of the disclosure includes the store information J2, receipt date information J4, line item information J5 (quantity information J51, product name information J52, unit price information J53), subtotal information J6, tax information J7, and transaction total information J8.

The information that is extracted in step SB2 (referred to below as the "extraction information") is a subset of the transaction information included in the print data that is used by the control server 15 to provide a reward points service and a transaction information provider service as described further below. The extraction information in this embodiment is the transaction total information J8.

The recording device storage unit 32 of the recording device 12 stores extraction information-related configuration information (configuration information). The extraction information-related configuration information is information including at least information identifying the type of information that is extracted (referred to below as "extracted type information"), and information identifying the method of extracting the information (referred to below as the "extraction method information"), as the extraction information that is extracted by the recording device control unit 30 in step SB2. When there are plural types of extraction information to extract, the extraction information-related configuration information includes extracted type information and extraction method information for each of the plural types of information to extract.

For example, when a string search is used to extract the extraction information, the extraction method information is information including the search key used in the string search, and information identifying the relationship between the search key and extraction information.

The user can change the content of the extraction information-related configuration information by a specific means. For example, the user may input instructions for changing the content of the extraction information-related configuration information through a user interface provided by the control server 15. Based on the user input through the user interface, the control server 15 sends specific control commands to the recording device 12, causing the recording device 12 to change the content of the extraction information-related configuration information.

Further alternatively, the user may connect a laptop computer or other computer having a specific preinstalled software tool to the recording device 12, and input instructions for changing the content of the extraction information-related configuration information through a user interface provided by the specific software tool. In this event, the computer sends specific control commands to the recording device 12 based on the user input through the user interface, causing the recording device 12 to change the content of the extraction information-related configuration information.

Further alternatively, the user may input instructions for changing the content of the extraction information-related configuration information through a user interface provided by a POS application or printer driver installed on the POS terminal 13. In this event, the POS terminal 13 sends specific control commands to the recording device 12 based on the user input through the user interface, causing the recording device 12 to change the content of the extraction information-related configuration information.

In step SB2, the recording device control unit 30 references the extraction information-related configuration information stored by the recording device storage unit 32, and extracts the extraction information from the print data based on the extraction method information contained in the extraction information-related configuration information.

The process of step SB2 is a process of extracting extraction information used in a specific process executed by the control server 15 (control device) from transaction information based on a transaction process.

Next, the recording device control unit 30 encrypts the extraction information extracted in step SB2 with a specific encryption key (step SB3). The encryption key is previously stored in the recording device 12 by a specific means. The encryption key in this example is a public key issued by the control server 15, and the control server 15 can decrypt the information encrypted with the encryption key using a private key managed by the control server 15.

Below, the encrypted extraction information is referred to as "encrypted extraction information."

Next, the recording device control unit 30 acquires a specific URL (Uniform Resource Locator) of the control server 15, and adds the encrypted extraction information (each set of encrypted extraction information when there are more than one) and uniform identification information (identification information) to the acquired URL as a URL query parameter (step SB4).

The URL of the control server 15 the recording device control unit 30 acquires in step SB4 is previously registered by a specific method and recorded in a configuration file not shown. In step SB4, the recording device control unit 30 references the configuration file to get the URL of the control server 15.

The uniform identification information contains the serial number uniquely identifying the recording device 12, and the receipt identification information J3 described above. The uniform identification information enables identifying what receipts are produced by which recording devices 12 in plural store systems 11.

In step SB4, the recording device control unit 30 adds a parameter name identifying the type of extraction information in the encrypted extraction information, and the encrypted extraction information as the parameter value, to the URL of the control server 15 as a URL query parameter.

The recording device control unit 30 also adds a parameter name corresponding to the uniform identification information, and the uniform identification information as the parameter value, to the URL of the control server 15 as a URL query parameter.

The URL of the control server 15 to which the encrypted extraction information and uniform identification information are added is referred to below as the first URL.

Next, the recording device control unit 30 generates image data for a 2D code representing the first URL (step SB5). A program with a function for generating image data for a 2D code symbol representing specific information based on the specific information is previously installed on the recording device control unit 30. In step SB5, the recording device control unit 30 runs this program to generate the image data for the 2D code symbol representing the first URL.

Next, based on the print data received in step SB1 and the image data for the 2D code symbol generated in step SB5, the recording device control unit 30 controls the recording device recording unit 31 to produce a receipt (step SB6). The resulting receipt is then given to the customer.

More specifically, in step SB6, the recording device control unit 30 controls the recording device recording unit 31 based on the print data, and records the receipt information on roll paper. After recording the receipt information, the recording device control unit 30 controls the recording device recording unit 31 based on the image data for the generated 2D code to record the code image J9 on roll paper.

Next, the recording device control unit 30 controls the recording device recording unit 31 and cuts the roll paper.

As a result, a receipt on which the code image J9 of the 2D code expressing the first URL is recorded is produced as shown in the sample receipt R1 in FIG. 4.

Next, the recording device control unit 30 determines if communication with the control server 15 is possible (step SB7). A program with a function for requesting a response from the control server 15 at a regular interval and monitoring if communication with the control server 15 is possible based on the request is preinstalled on the recording device 12. In step SB7, the recording device control unit 30 determines by this program function if communication with the control server 15 is possible. Note that the method used in step SB7 is not limited to the foregoing, and any appropriate method may be used.

Communication being disabled in this embodiment of the disclosure is not limited to being completely unable to communicate with the control server 15, and includes there being a communication delay exceeding a specific threshold, and communication being unstable for a longer than a specific threshold.

If communication with the control server 15 is possible (step SB7: YES), the recording device control unit 30 controls the recording device network communication unit 34 to send the print data received in step SB1 and the uniform identification information to the control server 15 (step SB8). Information related to the data destination (such as the address and protocol) and the format of the transmitted data is previously registered in the recording device 12.

If communication with the control server 15 is not possible (step SB7: NO), the recording device control unit 30 executes a disabled communication handling process (step SB9).

In the disabled communication handling process in step SB9, the recording device control unit 30 monitors if communication with the control server 15 has been re-enabled. If communication is possible, the recording device control unit 30 sends data including the print data and uniform identification information to the control server 15.

As described above, the print data and uniform identification information may not be sent immediately from the recording device 12 to the control server 15 when a receipt is printed, and the print data and uniform identification information may instead be sent after a specific time has past after the receipt is printed.

As shown in column (C) of FIG. 3, the control server control unit 40 of the control server 15 controls the control server network communication unit 41 to receive the print data and uniform identification information transmitted by the recording device 12 in step SB8 or SB9 (step SC1).

Next, the control server control unit 40 extracts the transaction information from the received print data (step SC2).

As described above, the transaction information is a predefined subset of the receipt information recorded on the receipt. In the sample receipt R1 shown in FIG. 4 in this example, the transaction information includes the store information J2, receipt date information J4, line item information J5 (quantity information J51, product name information J52, unit price information J53), subtotal information J6, tax information J7, and transaction total information J8.

Next, the control server control unit 40 accesses the transaction information manager database 421 stored on the control server storage unit 42, and executes the process described below (step SC3).

Figure 5A:
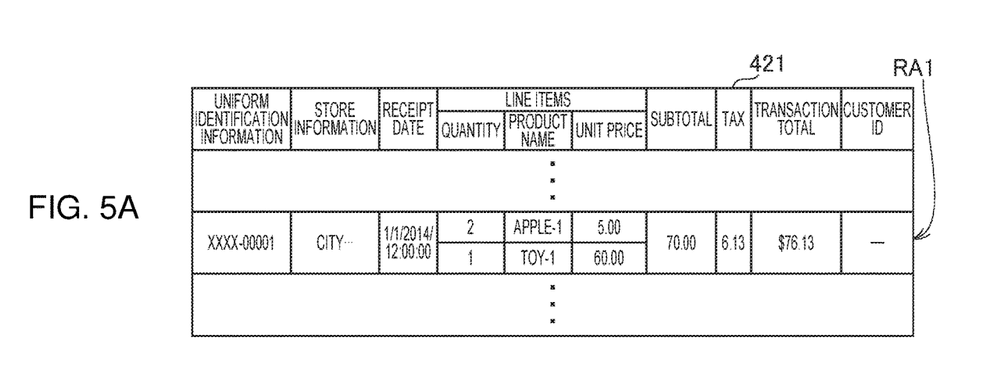
FIGS. 5A to 5C show the data structure of a transaction information management database.

FIG. 5A illustrates the data structure of the transaction information manager database 421.

As shown in FIG. 5A, each record in the transaction information manager database 421 has a field for storing the uniform identification information. The uniform identification information is the primary key in the transaction information manager database 421.

As shown in FIG. 5A, each record in the transaction information manager database 421 also has fields for storing the transaction information, or more specifically, fields for storing the store information J2, receipt date information J4, line item information J5 (quantity information J51, product name information J52, unit price information J53), subtotal information J6, tax information J7, and transaction total information J8.

As shown in FIG. 5A, each record in the transaction information manager database 421 also has a field for storing a customer ID. The customer ID is described further below.

In step SC3, the control server control unit 40 determines if there is a record in the transaction information manager database 421 storing the uniform identification information received in step SC1 as the primary key.

As will be understood below, the transaction information manager database 421 is accessed by the terminal 16 based on reading the code image J9 before the process of step SC3 is executed, and when step SC3 executes, there may already be a record storing the uniform identification information received in step SC1 as the primary key as a result of a record being created in the transaction information manager database 421 as a result of said access by the terminal 16.

If a record storing the uniform identification information received in step SC1 as a primary key is not found in the transaction information manager database 421 (step SC3: NO), the control server control unit 40 creates a record in the transaction information manager database 421, and fills the appropriate fields in that record with the uniform identification information and transaction information. The control server control unit 40 stores a null value in the customer ID field in that record (step SC4).

Record RA1 in FIG. 5A is an example of the record created in step SC4.

If there is a record storing the uniform identification information received in step SC1 (referred to below as the "previously registered record") in the transaction information manager database 421 (step SC3: YES), the control server control unit 40 executes the following process (step SC5).

Figure 5B:
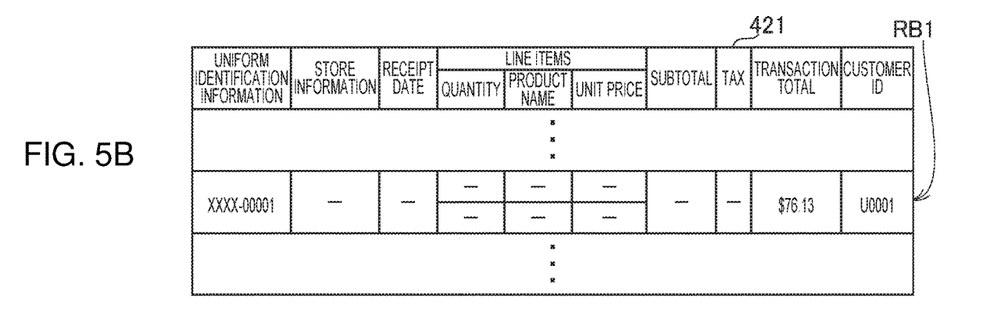

FIG. 5B shows an example of the transaction information manager database 421, record RB1 shown in FIG. 5B being an example of a previously registered record.

As shown in FIG. 5B, the uniform identification information, transaction total information J8 from the extraction information, and the customer ID are stored in the corresponding fields of the previously registered record, and null data is stored in the other fields. Why the fields of the previously registered record are filled this way is described further below.

In step SC5, the control server control unit 40 stores the transaction information extracted in step SC2 in the appropriate fields of the previously registered record for storing the transaction information. In this event, the control server control unit 40 overwrites the transaction total information J8 already stored in the field that stores the transaction total information J8 with the transaction total information J8 extracted in step SC2.

Figure 5C:
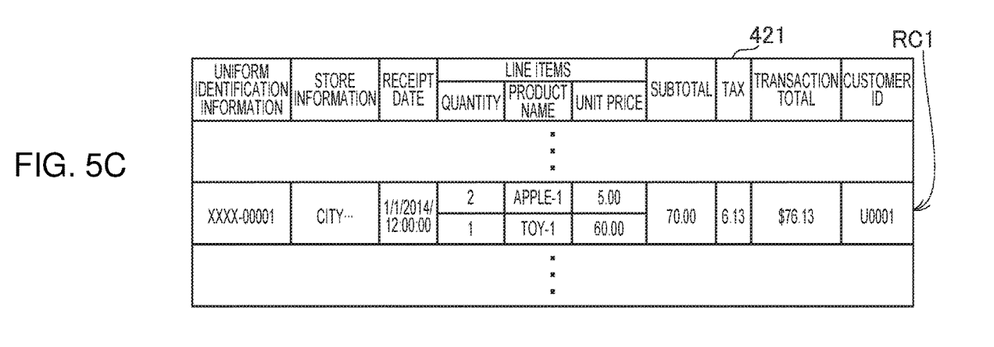

FIG. 5C shows another example of the transaction information manager database 421, record RC1 in FIG. 5C being an example of the record after step SC5 is completed.

If there is already a previously registered record in the transaction information manager database 421, the control server control unit 40 does not create a new record after extracting the transaction information from the print data received from the recording device 12, and instead updates the content of the previously registered record with the extracted transaction information. This prevents storing a duplicate record with the same transaction information in the transaction information manager database 421, and wrong analytical results being calculated when later analyzing transaction information, such as tabulating sales, based on the content of the transaction information manager database 421.

The processes executed by the terminal 16 and the control server 15 when a customer that has completed a transaction uses the customer's own terminal 16 to read the code image J9 from the receipt given to the customer.

Figure 6:
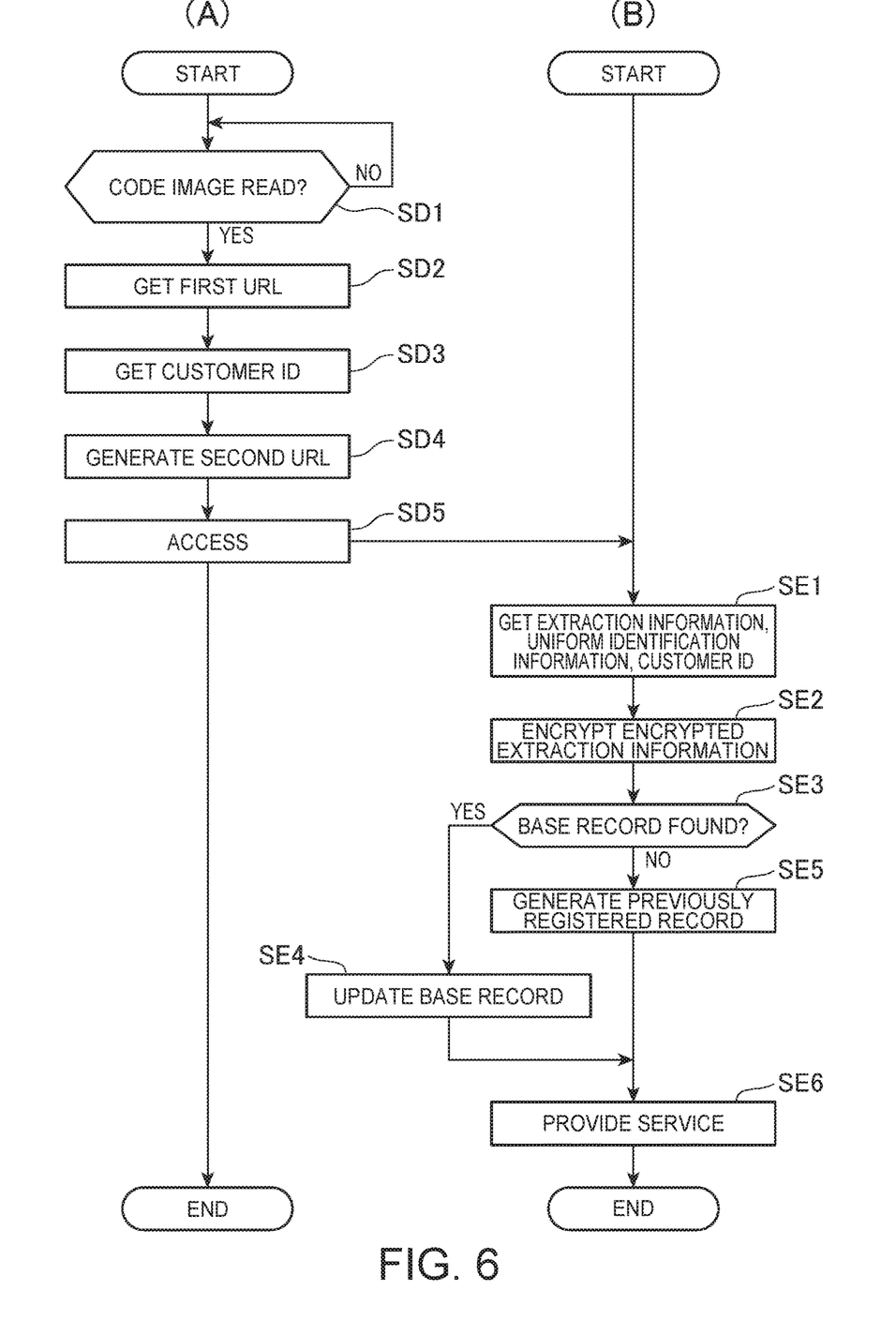
FIG. 6 is a flow chart illustrating the operation of a terminal and the control server.

FIG. 6 is a flow chart of the operation of the terminal 16 and the control server 15 when a code image J9 is read, column (A) of FIG. 6 showing the operation of the terminal 16, and column (B) of FIG. 6 the operation of the control server 15.

The customer that received the receipt starts the terminal application AP on the terminal 16 and takes a picture of the code image J9 printed on the receipt with the camera 55.

As shown in column (A) of FIG. 6, the terminal application execution unit 501 of the terminal control unit 50 of the terminal 16 analyzes the picture image data input from the camera 55 at a specific period and determines if image data for the 2D code symbol is contained in the picture image data (step SD1).

If image data for the 2D code symbol is contained in the picture image data (step SD1: YES), the terminal application execution unit 501 executes the following process (step SD2). Note that below the image data for the 2D code symbol contained in the picture image data is image data based on the code image J9 that was printed on the receipt.

In step SD2, the terminal application execution unit 501 analyzes the image data for the 2D code symbol contained in the picture image data, and acquires the first URL added to the 2D code. As described above, this first URL is the URL of the control server 15 to which the encrypted extraction information and uniform identification information were added as a URL query parameter.

Next, the terminal application execution unit 501 gets the customer ID (step SD3). The customer ID is identification information previously assigned to each customer that can receive a reward point service from the control server 15, and is previously stored in a specific storage area in a format that can be accessed by the terminal application execution unit 501.

Next, the terminal application execution unit 501 adds the customer ID acquired in step SD3 as a URL query parameter to the first URL acquired in step SD2 (step SD4). More specifically, the terminal application execution unit 501 adds the customer ID as the parameter value of a parameter name identifying the customer ID to the first URL.

The first URL after the customer ID was added as a URL query parameter is referred to below as a "second URL." The second URL is the URL of the control server 15 plus the encrypted extraction information, uniform identification information, and customer ID added as URL query parameters.

Next, the terminal application execution unit 501 accesses the second URL (step SD5).

As shown in column (B) of FIG. 6, the control server control unit 40 of the control server 15 acquires the encrypted extraction information, uniform identification information, and customer ID that are added as URL query parameters when the customer terminal 16 accesses the second URL (step SE1).

Next, the control server control unit 40 decrypts the encrypted extraction information using the private key, and acquires the extraction information (the transaction total information J8 in this example) (step SE2).

Next, the control server control unit 40 accesses the transaction information manager database 421 stored in the control server storage unit 42, and executes the following process (step SE3).

More specifically, in step SE3, the control server control unit 40 determines if there is a record storing the uniform identification information acquired in step SE1 as the primary key (referred to below as the "base record") in the transaction information manager database 421.

If the process of step SC4 is executed before the process of step SE3 executes, a base record will already be stored in the transaction information manager database 421 when step SE3 executes.

However, if the process of step SC4 has not executed before step SE3, a base record will not be stored in the transaction information manager database 421 when step SE3 executes.

For example, if the recording device 12 prints a receipt in step SB6 in the flow chart in column (B) of FIG. 3, then determines in step SB7 that communication with the control server 15 is disabled, and sends data to the control server 15 in the disabled communication handling process of step SB9, a base record may not exist in the transaction information manager database 421 when step SE3 executes. This is because the terminal 16 may access the control server 15 based on reading the code image J9 before communication is re-enabled and the recording device 12 can send data to the control server 15.

If a base record exists (step SE3: YES), the control server control unit 40 executes the following process (step SE4).

In step SE4, the control server control unit 40 stores the customer ID acquired in step SE1 in the corresponding field of the base record (updates the base record). As a result, the base record storing the uniform identification information acquired in step SE1 as the uniform identification information has the uniform identification information, transaction information, and customer ID stored in the corresponding fields as shown in FIG. 5C.

The record after being updated in step SE4 is referred to below as a "normal record."

If the base record does not exist (step SE3: NO), the control server control unit 40 executes the following process (step SE5).

In step SE5, the control server control unit 40 creates one record in the transaction information manager database 421, and stores the uniform identification information and customer ID acquired in step SE1, and the extraction information (transaction total information J8 in this example) acquired in step SE2, in the corresponding fields of the created record. This results in a new record (previously registered record) storing the uniform identification information, extraction information (transaction total information J8 in this example), and the customer ID in the corresponding fields as shown in FIG. 5B.

As will be understood by comparing FIG. 5B and FIG. 5C, the corresponding record contains the uniform identification information, extraction information, and customer ID both when the process of step SE4 is executed and when step SE5 is executed based on the decision of step SE3.

After step SE4 or step SE5, the control server control unit 40 provides a reward point service based on the normal record updated in step SE4 or the previously registered record created in step SE5 (step SE6).

A reward points service in this example is a service that awards points based on the total amount paid by the customer in the transaction (=the amount in the transaction total information J8) to the customer.

Described more specifically using the transaction information manager database 421 shown in FIGS. 5A to 5C for example, the control server storage unit 42 of the control server 15 stores a database that relationally stores the customer ID to the balance of points previously awarded to the customer. The number of points awarded to the customer is previously set according to the total amount of the transaction.

In step SE6, the control server control unit 40 acquires the transaction total information J8 from the normal record updated in step SE4 or the previously registered record created in step SE5. As described above, the transaction total information J8 is stored in both the normal record updated in step SE4 and the previously registered record created in step SE5.

Next, the control server control unit 40 determines the number of points to award to the customer based on the amount indicated by the acquired transaction total information J8.

Next, the control server control unit 40 accesses a database relationally storing the customer ID and the balance of points owned by the customer, uses the customer ID as a search key to find the matching record, and then increases the balance of points in the located record by the number of points to award.

As a result of this reward points service, the customer's balance of points is increased according to the total amount the customer paid in the transaction.

A code image J9 (2D code) representing information including the URL of the control server 15 and extraction information is printed on receipts given to customers in this embodiment of the disclosure. When the control server 15 provides a service, this extraction information is information that is used in the process providing the service (a specific process).

If the server is accessed by the terminal 16 based on reading the code image J9, but print data and uniform identification information have not been received from the recording device 12 and a record based on print data and uniform identification information received from the recording device 12 has not been created, the control server control unit 40 executes the following process. That is, the control server control unit 40 acquires the extraction information added to the accessed URL, and based on the acquired extraction information, provides a reward points service. As a result, when the control server 15 is accessed from a terminal 16 based on reading a code image J9, the control server 15 can reliably provide a reward points service reflecting the customer transaction even if transmission of the print data and uniform identification information from the recording device 12 to the control server 15 is delayed by a communication problem, for example.

A transaction information provider service is described below as another example of a service provided by the control server 15.

A transaction information provider service is a service that responds to queries when, for example, a transaction information-related query is received from a specific device (management device) operated by someone with particular authority, such as the owner (service receiver) of the store where the store system 11 is deployed. The management device is an example of an "external device." When a query is received, the control server 15 attempts authentication by a specific method, and if authentication succeeds, provides the transaction information provider service.

A query is an attempt to retrieve the gross sales in a particular store during a specific period of time, or the total sales of a specific product during a specific period of time, for example. The control server control unit 40 of the control server 15 then acquires the required information from the transaction information manager database 421 in response to the query, and responds to the query based on the acquired information.

Queries that the management device can make include querying the number of times the terminal 16 accessed the control server 15 based on reading the code image J9 printed on a receipt during a specific time; and querying the gross total and average of the total amounts of transactions recorded on receipts from which the terminal 16 read the code image J9 printed on the receipts to access the control server 15 within a specific period of time.

Such queries can be answered as long as the transaction total information J8 (extraction information) in the transaction information has been stored in the corresponding record.

Because the record in the transaction information manager database 421 matching the transaction recorded on the receipt that was read by the terminal 16 that accessed the control server 15 based on reading the code image J9 stores a customer ID, the records for a particular customer can be differentiated from other records.

Furthermore, records are not created in the transaction information manager database 421 only when print data and uniform identification information are sent from the recording device 12 to the control server 15. More particularly, a record is also created in the database when the server is accessed by the terminal 16 if a record based on data received from the recording device 12 has not already been created. The created records store the transaction total information J8 as the extraction information. As a result, the control server 15 can return accurate information when queried by the management device even if transmission of the print data and uniform identification information from the recording device 12 to the control server 15 is delayed by a communication problem, for example.

As described above, the transaction processing system 1 according to this embodiment of the disclosure includes a control server 15 (control device) and a recording device 12 (processing device) that connects to the control server 15 through a global network GN (network).

The recording device 12 extracts extraction information used by the control server 15 to execute a process to provide a service (a specific process) from transaction information that is based on a transaction process, and outputs a code image J9 (code) representing the URL of the control server 15 to which the extraction information and uniform identification information (identification information) were added.

When accessed by the terminal 16 based on reading the code image J9, the control server 15 acquires and stores the extraction information and uniform identification information added to the URL, and uses the extraction information that was stored to execute the process corresponding to the service.

Thus comprised, the control server 15 can use the extraction information to provide a service when the control server 15 is accessed by the terminal 16 reading a code image J9, even if communication between the recording device 12 and control server 15 is disabled and transmission of the print data and uniform identification information from the recording device 12 to the control server 15 is delayed by a communication problem, for example.

The recording device 12 in this embodiment of the disclosure rewritably stores the extraction information-related configuration information (configuration information) related to the extraction information that is extracted, and extracts the extraction information based on the extraction information-related configuration information.

As a result, the user can change the extraction information that is extracted by the recording device 12 as desired.

In this embodiment of the disclosure the recording device 12 sends transaction information (print data) including the extraction information with uniform identification information to the control server 15 when communication with the control server 15 is enabled, and when communication with the control server 15 is disabled, sends the transaction information (print data) and uniform identification information after communication is enabled again.

When the control server 15 stores extraction information and uniform identification information as a result of access by the terminal 16, and the control server 15 then receives transaction information (print data) and uniform identification information from the recording device 12, the control server 15 writes the extraction information contained in the transaction information in the print data over the extraction information that was stored in response to access from the terminal 16, and stores the transaction information.

This prevents storing a duplicate record based on the same transaction information in the transaction information manager database 421, and prevents computing wrong analytical results when later analyzing transaction information, such as tabulating sales, based on the content of the transaction information manager database 421.

The recording device 12 in this embodiment of the disclosure can produce receipts printed with receipt information including the transaction information, and prints and outputs a code image J9 on the printed receipt.

Thus comprised, the user can receive a service from the control server 15 by the simple action of reading the code image J9 printed on the received receipt with the user's own terminal 16.

An example of a specific process executed by the control server 15 in this embodiment of the disclosure is a process that awards points based on the stored extraction information to the terminal 16 accessing the control server 15.

The control server 15 can therefore reliably award points based on a customer transaction when accessed from a terminal 16.

Another example of a specific process executed by the control server 15 in this embodiment of the disclosure is a process that returns information based on stored extraction information in response to a query from a management device (external device).

When queried about information related to a terminal 16 that accessed the control server 15 by reading a code image J9, the control server 15 can therefore return accurate information based on the record created in the transaction information manager database 421 in response to access from the terminal 16.

The disclosure is described above with reference to a preferred embodiment thereof, but the disclosure is not limited thereto and can be modified and adapted in many ways without departing from the scope of the accompanying claims.

Processes executed by devices in the transaction processing system 1 are described above using the transaction total information J8 as an example of the extraction information. This is because the transaction total information J8 is required for the control server 15 to provide the service used as an example in this embodiment. However, the extraction information is not limited to this information, and can be any information that can be used by the control server 15 to provide a service. For example, when the control server 15 provides a reward points service that awards points based on the customer purchasing a particular product, the extraction information may be information related to the products the customer purchased.

The code representing the second URL is a 2D code in the foregoing embodiments, but the code is not limited to a 2D code and may be any readable information.

The services provided by the control server 15 in the above examples are a reward points service and a transaction information provider service, but the services provided by the control server 15 are not so limited. For example, when accessed by a terminal 16 reading the code image J9, the control server 15 may provide a service that sends drawing data for displaying an electronic receipt to the terminal 16 that accessed the server and displays an electronic receipt on the terminal 16. In this case, the recording device 12 extracts the information required to display an electronic receipt as the extraction information, and records a code image J9 representing the URL of the control server 15 to which the extracted extraction information was added on the receipt.

In the embodiment described above, the recording device 12 outputs a code representing a second URL by printing a code image J9 on the receipt. The method of outputting the second URL is not so limited, however. For example, the recording device 12 may output the code representing the second URL by displaying the code image J9 on the recording device display unit 35. In this case, the customer that performed the transaction can reliably receive a service reflecting the transaction from the control server 15 by using their own terminal 16 to simply read the code image J9 displayed on the recording device display unit 35.

The recording device 12 sends print data based on a transaction to the control server 15, and the control server 15 extracts transaction information from the print data, in the embodiment described above. However, the recording device 12 may extract the transaction information from the print data and send the transaction information to the control server 15.

The recording device 12 functions in the embodiment described above as the processing device that extracts extraction information and outputs a code representing a second URL. Alternatively, the POS terminal 13 and control server 15 may be communicatively connected, and the POS terminal 13 may execute the processes of the recording device 12 described above and function as the processing device.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A transaction processing system comprising:
   a printing device;
   a terminal; and
   a control server communicable with the printing device and the terminal through a network;
   wherein the printing device is configured to:
      receive transaction information from a point of sale terminal;
      extract extraction information from the transaction information;
      generate a code by adding, to a URL of the control server, the extraction information and identification information identifying the transaction information; and
      print the code on a transaction receipt;
   wherein the terminal is configured to:
      acquire the URL by reading the code printed on the transaction receipt;
      acquire a customer ID previously stored in a specific storage area; and
      access the control server based on the URL;
   wherein, the control server is configured to:
      when accessed by the terminal based on reading the code, determine if a record exists, the record including the identification information as a primary key;
      when the record exists, store the customer ID in a corresponding field of the record;
      when the record does not exist, create a record, and store the extraction information, the identification information, and the customer ID in corresponding fields of the created record; and
      execute a specific process based on the record.

2. The transaction processing system described in claim 1, wherein:
   the printing device stores configuration information related to the extraction information to extract, and extracts the extraction information based on the configuration information.

3. The transaction processing system described in claim 1, wherein:
   the printing device sends the identification information and the transaction information including the extraction information to the control server when communication with the control server is enabled, and
   when communication with the control server is disabled, the printing device sends the identification information and the transaction information including the extraction information to the control server after communication is enabled again; and
   the control server stores the transaction information by overwriting the extraction information stored in response to access from the terminal with the extraction information contained in the transaction information when the transaction information and the identification information are received from the printing device after the extraction information and the identification information are stored in response to access from the terminal.

4. The transaction processing system described in claim 1, wherein:
   the printing device produces the transaction receipt printed with the transaction information, and prints and outputs the code on the produced receipt.

5. The transaction processing system described in claim 1, wherein:
the printing device has a display unit configured to display information, and displays and outputs the code on the display unit.

6. The transaction processing system described in claim 1, wherein:
the specific process executed by the control device is a process of awarding points based on the stored extraction information to the terminal that accessed the control server.

7. The transaction processing system described in claim 1, wherein:
the specific process executed by the control device executes is a process of returning information based on the stored extraction information in response to a query from an external device.

8. A printing device communicable with a control server through a network,
the printing device configured to:
receive transaction information based on a transaction process from a point of sale terminal;
extract extraction information from the transaction information;
generate a code by adding, to a URL of the control server, the extraction information and identification information identifying the transaction information; and
print the code on a transaction receipt,
wherein:
when communication with the control server is enabled, the printing device sends the identification information and the transaction information including the extraction information to the control server, and
when communication with the control server is disabled, the printing device sends the identification information and the transaction information including the extraction information to the control server after communication is enabled again.

9. The printing device described in claim 8, wherein:
the printing device stores configuration information related to the extraction information to extract, and extracts the extraction information based on the configuration information.

10. The printing device described in claim 8, wherein:
the printing device produces the receipt printed with the transaction information, and prints and prints the code on the produced receipt.

11. The printing device described in claim 8, further comprising:
a display unit configured to display information, and display and output the code on the display unit.

12. A control server communicable with a printing device through a network,
the control server configured to:
receive an access from a terminal based on reading a code printed by the printing device, wherein the code is generated by adding, to a URL of the control server, identification information identifying transaction information and extraction information extracted from the transaction information;
determine if a record exists, the record including the identification information as a primary key;
when the record exists, store the customer ID in a corresponding field of the record;
when the record does not exist, create one record, and store the exaction information, the identification information, and the customer ID in corresponding fields of the created record; and
execute a specific process based on the record.

13. The control server described in claim 12, wherein:
the control server stores the transaction information by overwriting the extraction information stored in response to access from the terminal with the extraction information contained in the transaction information when the transaction information and the identification information are received from the printing device after the extraction information and the identification information are stored in response to access from the terminal.

14. The control server described in claim 12, wherein:
the specific process executed by the control device is a process of awarding points based on the stored extraction information to the terminal that accessed the control server.

15. The control device described in claim 12, wherein:
the specific process executed by the control device executes is a process of returning information based on the stored extraction information in response to a query from an external device.

16. The transaction processing system described in claim 1, wherein:
the printing device is configured to print the code after the transaction process occurs.

17. The printing device described in claim 8, wherein:
the printing device prints the code after the transaction process occurs.

18. The control device described in claim 12, wherein:
the code is printed by the printing device after the transaction process occurs.

* * * * *